United States Patent Office 3,353,644
Patented Nov. 21, 1967

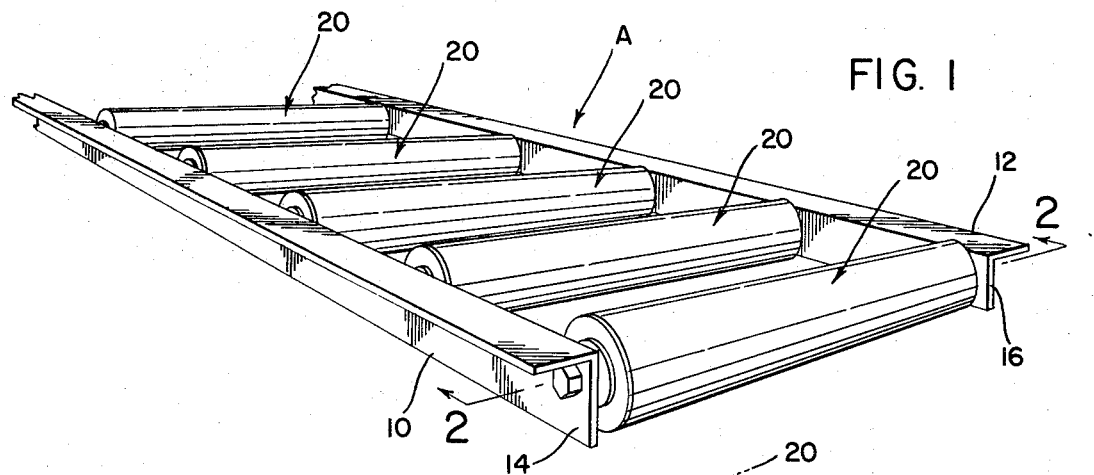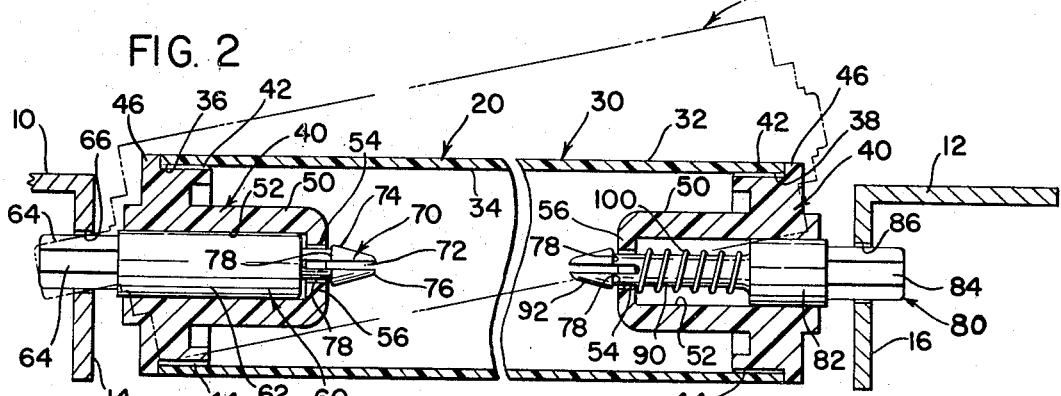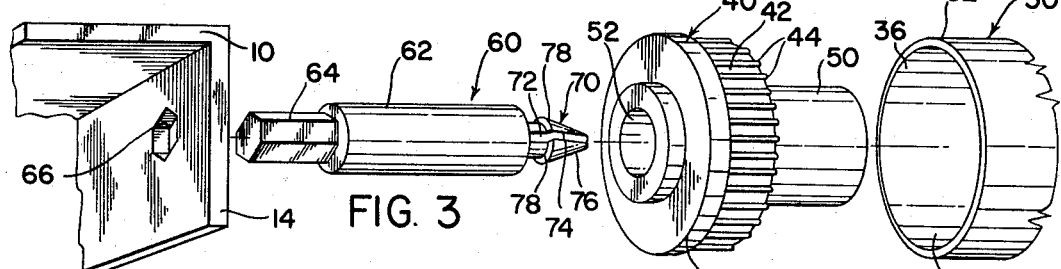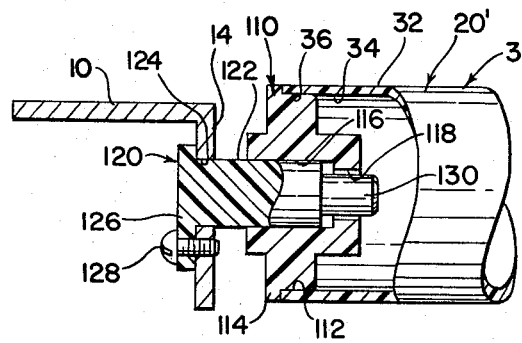
INVENTORS.
HOWARD H. McNASH &
WILLIAM R. FOX
BY
Meyer, Tilberry & Body
ATTORNEYS

3,353,644
ROLLER FOR A CONVEYOR
Howard Hamilton McNash and William R. Fox, Cleveland, Ohio, assignors to Colonial Plastics Manufacturing Co., Cleveland, Ohio, a corporation of Ohio
Filed Jan. 24, 1966, Ser. No. 522,424
5 Claims. (Cl. 193—37)

ABSTRACT OF THE DISCLOSURE

There is provided a roller for a gravity conveyor which is formed from a tube of plastic material and two plastic end caps. Pins including internal bearing surfaces and inwardly extending gripping protrusions are snapped into the end caps. This holds the pins with respect to the end caps to form a completed roller. The pin provides both the bearing feature for the roller and the means for mounting the roller on a supporting rail. The mounting means are outboard protrusions on the afore-mentioned pins.

This invention pertains to the art of conveyors and more particularly to a roller for use in a conveyor.

The present invention is particularly applicable for use in a gravity conveyor including a plurality of closely spaced, parallel rollers and it will be described with particular reference thereto; however, it will be appreciated that the invention has somewhat broader applications and may be used for roller elements of general utility.

It is somewhat common practice to utilize a plurality of closely spaced, parallel rollers extending along a given path to provide a gravity conveyor for transporting various objects, such as cardboard boxes and metal containers. In the past, the roller elements for these conveyors were formed from a metal tube having axially extending stub shafts. These shafts were mounted in bearings on side rails so that the rollers would rotate when contacted by a moving object. This general type of conveyor has been used for a number of years; however, it has been subject to various disadvantages. First, the roller elements are quite heavy; therefore, a reinforced framework was required to support the conveyor itself. Second, when the roller elements wore out, a considerable time was required to replace them. Third, and most importantly, the metal rollers were subject to rapid corrosion, especially when the conveyor was being used in a corrosive atmosphere such as salt moisture in coastal areas. Although all of these disadvantages of the prior metal rollers have been known for many years, there has not been developed, to my knowledge, a roller element overcoming the inherent disadvantages of the prior rollers.

All of the above mentioned disadvantages of the prior rollers for use in gravity conveyors, and other disadvantages, are completely overcome by the present invention which relates to a novel and improved construction for the individual rollers used in such a conveyor.

In accordance with the present invention, there is provided a conveyor roller for use between parallel side rails. This roller comprises a hollow plastic sleeve having a cylindrical, outer support surface, a cylindrical inner surface, and axially spaced openings defined by the inner surface; and a pair of end caps, each of which is molded from plastic and has an outwardly facing, cylindrical mounting surface. One of the end caps is secured within each opening of the plastic sleeve with the mounting surface of the end caps engaging the inner surface of the sleeve. There is also provided means secured onto each of the end caps for rotatably mounting the roller onto the parallel side rails.

The primary object of the present invention is the provision of a roller for a conveyor which roller is inexpensive, easily installed, lightweight and unaffected by most corrosive atmospheres.

Another object of the present invention is the provision of a roller for a conveyor which roller is formed from plastic components.

Still another object of the present invention is the provision of a roller for a conveyor which roller is formed from elements which are easy to produce and assemble.

These and other objects and advantages will become apparent from the following description used to illustrate the preferred embodiments of the invention as read in connection with the accompanying drawings in which:

FIGURE 1 is a perspective view showing the preferred embodiment of the present invention;

FIGURE 2 is an enlarged, cross-sectional view taken generally along line 2—2 of FIGURE 1;

FIGURE 3 is an exploded, partial view illustrating one aspect of the present invention; and, FIGURE 4 is a partially cross-sectioned view illustrating a modification of the present invention.

Referring now to the drawing wherein the showings are for the purpose of illustrating preferred embodiments of the invention only and not for the purpose of limiting same, FIGURE 1 shows a gravity conveyor A including parallel side rails 10, 12 having vertically extending mounting flanges 14, 16, respectively. A plurality of closely spaced parallel rollers 20, constructed in accordance with the present invention, are positioned between the side rails 10, 12 to present a conveying surface along which various objects can be moved by gravity force or other forces.

The rollers 20 are best shown in FIGURES 2 and 3, and they include a plastic sleeve 30 having an outer cylindrical, support surface 32, an inner cylindrical surface 34 and axially spaced openings 36, 38. In accordance with the invention, the sleeve 30 is formed from a thermoplastic material, which in practice is extruded polyvinylchloride. It is appreciated that other similar plastic materials can be used to form the sleeve 30 without departing from the intended spirit and scope of the invention. Further in accordance with the invention, the rollers 20 include a pair of end caps 40 secured within the axially spaced openings 36, 38. These end caps are formed by injection molding an acetal resin, such as "Celcon." The acetal resin may be either a homopolymer, such as "Derlin," or a copolymer, such as "Celcon." In addition, other similar thermoplastic materials having relatively good bearing characteristics, such as "Teflon" and "nylon," may also be used to injection mold the end caps 40.

Each end cap includes a cylindrical, outwardly facing mounting surface 42 with circumferentially spaced, axially extending ribs 44. The outermost portions, or tips, of the ribs define a cylindrical surface slightly larger than the internal diameter of the inner surface 34 of sleeve 30. Consequently, the caps 40 may be forced into the openings 36, 38 with the ribs providing a tight lock between these two elements. It is appreciated that an adhesive may be used to hold the end caps within the sleeve openings; however, with the ribs as shown in FIGURES 2 and 3, adhesive is generally not required unless the dimensional tolerances prevent a tight fit between the end caps and the sleeve. Flanges 46 on the end caps locate the caps with respect to the sleeve so that they are accurately positioned at the opposite ends of the roller 20. Each cap also includes a shank 50 having an internal bearing surface 52 and an innermost aperture 54 which aperture defines flange 56, the function of which will be hereinafter described.

A first bearing pin 60, preferably formed from a material similar to that used in forming the end caps 40, is positioned within the end cap adjacent opening 36. The bearing pin includes an outer cylindrical bearing surface 62 generally matching bearing surface 52. A stub shaft 64 having a hexagonal cross-section extends outwardly from roller 20 and is received within a hexagonal aperture 66 in mounting flange 14. The opposite end of pin 60 includes nose 70 having an axial slot 72 which defines resilient fingers 74, 76. By providing locking shoulders 78 on the resilient fingers, the pins may be easily assembled into the caps 40 by forcing nose 70 through aperture 54. This provides an inexpensive arrangement for assembling the bearing pin onto the end cap.

At the opposite end of roller 20 there is provided a second bearing pin 80. This pin is essentially the same as pin 60; however, there are certain structural differences. Pin 80 includes a short bearing surface 82 which coacts with surface 52 to rotatably mount the roller 20. A stub shaft 84 has a hexagonal cross-section and extends outwardly from the roller and through a hexagonal aperture 86 within mounting flange 16. A shank 90 extends between the bearing surface 82 and a nose 92. The nose 92 is structurally identical to nose 70 of pin 60. A coil spring 100 is placed around shank 90 so that the pin 80 is biased outwardly. Locking shoulders 78 on nose 92 prevent pin 80 from being forced by the spring from cap 40.

To assemble the roller 20, pin 80 is forced inwardly against the force of spring 100. Stub shaft 64 is then inserted within aperture 66 and the roller is moved from the phantom line position shown in FIGURE 2 to the solid line position. Thereafter, pin 80 is released so that stub shaft 84 is forced by spring 100 through aperture 86. The roller 20 is now in its operating position. Removal of the roller is accomplished by reversing the above described operations.

In some installations, the long bearing surface 62 of pin 60 may cause an undue accumulation of grit or small particles. When this is a particular problem, it is contemplated that the rearwardmost portion of this surface may be undercut to present a lesser diameter. This diameter is still greater than the internal diameter of spring 100 so that the spring may be assembled onto only the pin 80 and the undercut portion will not pass through the aperture 54. Other modifications may be made in the pins 60, 80 without departing from the present invention.

Referring now to FIGURE 4, roller 20' includes two axially spaced end caps 110. Only one end cap is illustrated since both are substantially identical. This end cap includes an outwardly facing cylindrical mounting surface 112 adhesively secured to the inner surface 34 of sleeve 30. An abutment flange 114 positions the cap 110 axially with respect to the sleeve 30. The end cap is provided with a cylindrical inner bearing surface 116 terminating in aperture 118. A support pin 120 is provided with a bearing surface 122 extending through aperture 124 in flange 14. The pin 120 is located with respect to side rail 10 by a mounting flange 126, and the pin is locked in the proper position by a bolt 128 extending through the flange 126 into the flange 14. For support purposes, shank 130 of pin 120 extends through aperture 118. It is appreciated that this shank may be omitted if desired.

The present invention has been described in connection with two structural embodiments; however, it is appreciated that various changes may be made in these embodiments without departing from the intended spirit and scope of the present invention, as defined in the appended claims.

Having thus described our invention, we claim:

1. In an end cap for use with a hollow, cylindrical sleeve to form a conveyor roller, said cap being molded from plastic and including: an outwardly facing, generally cylindrical mounting surface and an inner, generally cylindrical inner bearing surface, said mounting surface being adapted to be received within said sleeve and said bearing surface being adapted to receive a pin for rotatably mounting said cap with respect to a fixed object, the improvement comprising: said end cap including an aperture inward of said bearing surface; and, a pin having an outer bearing surface generally matching said inner bearing surface and a protrusion extending through said aperture; means on said protrusion for gripping said end cap to hold said pin in place; and, said pin having a second protrusion extending outboard of said end cap for mounting said cap onto a mounting plate.

2. The improvement as defined in claim 1 wherein said gripping means is a pair of flexible fingers each having gripping shoulders for snapping into gripping relationship with said cap.

3. The improvement as defined in claim 1 including a spring means in said cap for biasing said pin in the outboard direction.

4. A conveyor roller for use between parallel side rails, said roller comprising: a hollow plastic sleeve having a cylindrical, outer support surface, a cylindrical, inner surface, and axially spaced opennigs defined by said inner surface; a pair of end caps, each of said end caps being molded from plastic and having an outwardly facing, generally cylindrical mounting surface; one of said caps being secured within each of said openings with said mounting surface engaging said inner surface of said sleeve; and, means secured onto each of said end caps for rotatably mounting said roller onto said parallel side rails, said end caps each including a cylindrical bearing surface concentric with said mounting surface, and said rotatable mounting means including a bearing pin extending into each of said end caps and having an outer bearing surface generally matching the bearing surface of the respective end caps, each of said pins having portions extending axially from said caps for mounting said roller onto said parallel side rails, said end caps also including a flange at the innermost end of said bearing surfaces and each of said bearing pins includes an innermost end having a resilient gripping element, said gripping element coacting with said flange to hold said pins within said end caps.

5. In a conveyor roller for use between parallel side rails, said roller comprising: a hollow plastic sleeve having a cylindrical, outer support surface, a cylindrical, inner surface, and axially spaced openings defined by said inner surface; and, an end cap of molded plastic having outer cylindrical mounting surfaces abutting said inner surface of said sleeve at each of said spaced openings, the improvement comprising: said end caps each includes a cylindrical opening defining an inner cylindrical bearing surface, each cap having a bearing pin extending into said opening and having an outer cylindrical bearing surface matching inner bearing surfaces, each of said pins being secured to said end cap and having outboard mounting protrusions supported by one of said rails, and one of said pins being movable axially for assembly of said roller onto said rail.

References Cited

UNITED STATES PATENTS

| | | | |
|---|---|---|---|
| 1,219,901 | 3/1917 | Alvey | 193—37 |
| 1,919,495 | 7/1933 | Allen | 193—37 |
| 2,642,242 | 6/1953 | Karitzky | 85—19 |
| 2,829,802 | 4/1958 | Paull | 222—92 |
| 2,886,156 | 5/1959 | Halbron | 193—37 |

FOREIGN PATENTS

| | | |
|---|---|---|
| 1,340,317 | 9/1963 | France. |
| 699,295 | 11/1953 | Great Britain. |

ANDRES H. NIELSEN, *Primary Examiner.*